United States Patent
Peyrucain et al.

(10) Patent No.: US 7,690,603 B2
(45) Date of Patent: Apr. 6, 2010

(54) METHOD AND DEVICE TO ASSIST IN THE PILOTING OF AN AIRCRAFT IN A NON-PRECISION APPROACH DURING A LANDING PHASE

(75) Inventors: Eric Peyrucain, Saint Genies Bellevue (FR); Patrice Rouquette, La Loubiere (FR); Christophe Jourdan, Toulouse (FR)

(73) Assignee: Airbus France, Toulouse (FR)

( * ) Notice: Subject to any disclaimer, the term of this patent is extended or adjusted under 35 U.S.C. 154(b) by 33 days.

(21) Appl. No.: 10/781,910

(22) Filed: Feb. 20, 2004

(65) Prior Publication Data
US 2004/0245408 A1    Dec. 9, 2004

(51) Int. Cl.
*G01C 21/00* (2006.01)

(52) U.S. Cl. .......................... 244/183; 244/195; 701/3; 701/16

(58) Field of Classification Search .................. 244/185, 244/186, 187–195; 701/3, 14, 15, 16, 120, 701/18
See application file for complete search history.

(56) References Cited

U.S. PATENT DOCUMENTS

| | | | |
|---|---|---|---|
| 3,041,607 A * | 6/1962 | Rhodes et al. | 342/407 |
| 3,666,929 A * | 5/1972 | Menn | 701/16 |
| 3,678,256 A * | 7/1972 | Harenberg, Jr. | 701/16 |
| 3,686,626 A * | 8/1972 | Bateman et al. | 340/980 |
| 3,735,341 A * | 5/1973 | Hedrick | 340/970 |
| 3,789,356 A * | 1/1974 | Harenberg et al. | 340/972 |
| 3,801,049 A * | 4/1974 | Simpson et al. | 244/187 |
| 3,843,077 A * | 10/1974 | Boone et al. | 244/183 |
| 3,848,833 A * | 11/1974 | Rauschelbach | 244/177 |
| 3,911,436 A * | 10/1975 | Schanzer et al. | 342/411 |
| 4,040,005 A * | 8/1977 | Melvin | 340/973 |
| 4,162,438 A * | 7/1979 | Osder | 318/564 |
| 4,359,733 A * | 11/1982 | O'Neill | 342/36 |
| 4,429,312 A * | 1/1984 | Chisholm | 342/410 |
| 4,649,484 A * | 3/1987 | Herzog et al. | 701/3 |
| 4,987,413 A * | 1/1991 | Grove | 340/970 |
| 5,111,403 A * | 5/1992 | Orgun et al. | 701/16 |
| 5,132,692 A * | 7/1992 | LaBerge | 342/173 |
| 5,136,518 A * | 8/1992 | Glover | 701/5 |
| 5,170,163 A * | 12/1992 | Collins et al. | 340/967 |

(Continued)

FOREIGN PATENT DOCUMENTS

WO    0225213 A2    3/2002

OTHER PUBLICATIONS www.wikipedia.com, "RAIM", pp. 1-2.*

(Continued)

*Primary Examiner*—Michael Carone
*Assistant Examiner*—Benjamin P Lee
(74) *Attorney, Agent, or Firm*—Dickinson Wright, PLLC

(57) ABSTRACT

A method to assist the piloting of an aircraft in a non-precision approach during a landing phase may include a series of successive steps that are carried out interactively and automatically. The steps include verifying, in accordance with respective standards of operation, conditions relating to the correct functioning of a plurality of equipment of the aircraft and to the integrity and precision of measurements of parameters used for implementing the non-precision approach, based on information from the plurality of equipment. On the basis of the verified conditions, an appropriate approach category is selected and presented on a display screen.

4 Claims, 1 Drawing Sheet

U.S. PATENT DOCUMENTS

| | | | |
|---|---|---|---|
| 5,377,937 A * | 1/1995 | LaMay et al. | 244/185 |
| 5,583,774 A | 12/1996 | Diesel | |
| 5,661,486 A | 8/1997 | Faivre et al. | |
| 5,695,157 A * | 12/1997 | Coirier et al. | 244/183 |
| 5,702,070 A * | 12/1997 | Waid | 244/183 |
| 5,722,620 A * | 3/1998 | Najmabadi et al. | 244/181 |
| 5,760,737 A * | 6/1998 | Brenner | 342/357.02 |
| 5,786,773 A * | 7/1998 | Murphy | 340/947 |
| 5,820,080 A * | 10/1998 | Eschenbach | 244/183 |
| 5,823,479 A * | 10/1998 | Nield et al. | 244/187 |
| 5,826,834 A * | 10/1998 | Potter et al. | 244/195 |
| 5,881,971 A * | 3/1999 | Hickman | 244/1 R |
| 5,901,927 A * | 5/1999 | Ho | 244/183 |
| 5,957,412 A * | 9/1999 | Saint Upery et al. | 244/180 |
| 5,968,106 A * | 10/1999 | DeVlieg et al. | 701/70 |
| 5,969,672 A | 10/1999 | Brenner | |
| 6,094,607 A | 7/2000 | Diesel | |
| 6,112,141 A * | 8/2000 | Briffe et al. | 701/14 |
| 6,157,876 A * | 12/2000 | Tarleton et al. | 701/16 |
| 6,163,753 A * | 12/2000 | Beckmann et al. | 701/213 |
| 6,188,937 B1 * | 2/2001 | Sherry et al. | 701/14 |
| 6,198,991 B1 * | 3/2001 | Yamakawa et al. | 701/16 |
| 6,216,065 B1 * | 4/2001 | Hall et al. | 701/16 |
| 6,239,745 B1 * | 5/2001 | Stratton | 342/410 |
| 6,292,720 B1 * | 9/2001 | Schulz et al. | 701/3 |
| 6,311,108 B1 * | 10/2001 | Ammar et al. | 701/16 |
| 6,324,448 B1 * | 11/2001 | Johnson | 701/7 |
| 6,341,247 B1 * | 1/2002 | Hreha et al. | 701/3 |
| 6,450,456 B1 * | 9/2002 | Greene | 244/186 |
| 6,505,102 B2 * | 1/2003 | Morizet et al. | 701/3 |
| 6,574,532 B2 * | 6/2003 | Lohmiller | 701/3 |
| 6,575,410 B2 * | 6/2003 | Greene | 244/186 |
| 6,591,170 B2 * | 7/2003 | Block et al. | 701/9 |
| 6,606,559 B1 * | 8/2003 | Beckmann et al. | 701/213 |
| 6,676,088 B1 * | 1/2004 | Greene | 244/187 |
| 6,711,479 B1 * | 3/2004 | Staggs | 701/16 |
| 6,785,594 B1 * | 8/2004 | Bateman et al. | 701/9 |
| 6,856,864 B1 * | 2/2005 | Gibbs et al. | 701/3 |
| 6,871,124 B1 * | 3/2005 | McElreath | 701/16 |
| 6,901,331 B1 * | 5/2005 | Beckmann et al. | 701/213 |
| 2001/0052562 A1 * | 12/2001 | Ishihara et al. | 244/175 |
| 2002/0121575 A1 * | 9/2002 | Greene | 244/186 |
| 2002/0158168 A1 * | 10/2002 | Greene | 244/186 |
| 2003/0127569 A1 * | 7/2003 | Bacon et al. | 244/195 |
| 2004/0199304 A1 * | 10/2004 | Tatham et al. | 701/16 |
| 2004/0225432 A1 * | 11/2004 | Pilley et al. | 701/117 |
| 2005/0096844 A1 * | 5/2005 | Pasturel et al. | 701/214 |
| 2006/0224281 A1 * | 10/2006 | Foucart et al. | 701/16 |
| 2006/0253232 A1 * | 11/2006 | Gerrity et al. | 701/16 |
| 2007/0129855 A1 * | 6/2007 | Coulmeau | 701/3 |
| 2008/0154447 A1 * | 6/2008 | Spinelli | 701/7 |

OTHER PUBLICATIONS www.wikipedia.com, "Instrument approach" pp. 1-2.*
V. Virball, et al.; "A Gap Integrity Channel Based Fault Detection and Exclusion Algorithm Using Maximum Solution Separation," Position and Navigation Symposium, 1994, IEEE Las Vegas, NV, USA Apr. 11-15, 1994, New York, NY, USA, IEEE, pp. 747-754, XP010117801, ISBN: 0-7803-1435-2.

* cited by examiner

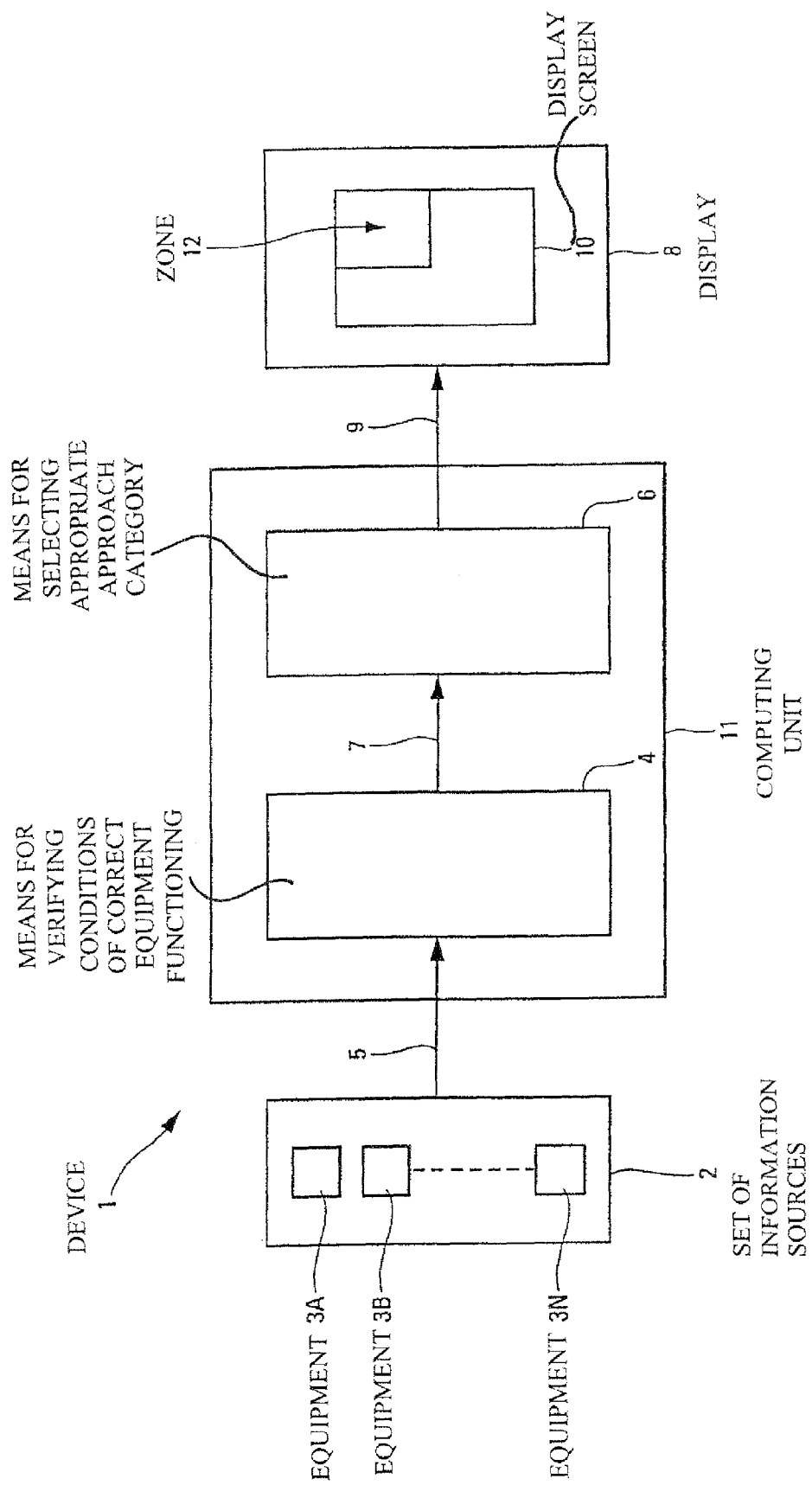

METHOD AND DEVICE TO ASSIST IN THE PILOTING OF AN AIRCRAFT IN A NON-PRECISION APPROACH DURING A LANDING PHASE

FIELD OF THE INVENTION

The present invention relates to a method and a device to assist in the piloting of an aircraft, in particular a civil transport aircraft, in a non-precision approach during a landing phase of that aircraft.

BACKGROUND OF THE RELATED ART

In the context of the present invention, the term "non-precision approach" is understood to be an approach which is not a precision instrument approach, such as for example an ILS (Instrument Landing System) type approach. It is known that, in order to use a precision instrument approach, ground stations are used which are located at the edge of the runway and at least one special radio receiver installed in the aircraft, which provides horizontal and vertical guidance before and during the landing by showing the pilot the lateral deviation with respect to an approach path and the vertical deviation with respect to a descent plan. Such a precision instrument approach provides great and effective assistance in landing (by lateral guidance and vertical guidance), particularly in poor visibility (fog, etc) or when there is no visibility.

A non-precision approach, such as considered in the present invention, therefore exists when the preceding items of information are totally or partially unavailable, such that a normal precision approach cannot be implemented.

In such a non-precision approach, the pilot of the aircraft must gather a plurality of items of information relating to the performance of the aircraft's navigation equipment (computers etc.) and to the integrity and precision of measurements of particular parameters, such as the position and altitude of the aircraft for example. The pilot must mentally synthesize all of this information and choose, for the landing, between:
- one of a plurality of possible assisted approach modes, for which the aircraft is provided with known means making it possible:
  - to determine a virtual approach path, in particular on the basis of information contained in a database installed in the aircraft;
  - to calculate the lateral and vertical deviations of the aircraft's position with respect to that virtual approach path; and
  - to present these deviations to the pilot.
  The aircraft is then piloted in such a way as to cancel these deviations; and
- a selected approach mode, for which the pilot enters descent instructions (slope, heading, etc.,) into an automatic pilot which carries out the piloting of the aircraft.

However, this obligatory mental synthesis of the various items of information increases the workload of the pilot and constitutes a significant loss of time, whilst the pilot already has to carry out many tasks at that same time for the purpose of the landing (management of communications with air traffic control, etc.).

Furthermore, the man/machine interface is different between the approach modes of an instrument approach and the approach modes of a non-precision approach, which in particular has the disadvantage of making the ergonomics of the piloting position complex.

SUMMARY OF THE INVENTION

The purpose of the present invention is to overcome these disadvantages. It relates to a method to assist the piloting of an aircraft in a non-precision approach during a landing phase.

For this purpose, according to the invention, the said method is noteworthy in that the following series of successive steps is carried out interactively and automatically:
a) there is verified a plurality of conditions relating at least to the correct functioning of a plurality of the aircraft's equipments and to the integrity and precision of measurements of particular parameters, information coming from the said equipments and the said measurements being able to be used for the implementation of the said non-precision
b) on the basis of the said verified conditions, an appropriate approach category is selected from a plurality of different approach categories; and
c) the approach category thus selected is presented on a display screen.

An approach category is a synthetic item of information making it possible for the pilot to appreciate the integrity, precision and availability of the items of information and the measurements that are supplied to him by the on-board equipments during the landing. Each approach category defines the approach mode or modes that are possible from among the different assisted approach modes described above during a non-precision landing.

Consequently, the degree of confidence that the pilot can have in the information provided to him varies according to the effective approach category determined by means of the invention. From an operational point of view, for the approach categories relating to reduced availability, precision or integrity, the pilot must overcome the lack of availability, precision or integrity by means of supplementary data verification actions.

Advantageously, the conditions verified in step a) comprise at least some of the following conditions:
- the correct functioning of each of the aircraft's two flight management computers;
- the correct functioning of a satellite positioning function of each of the aircraft's two multimode landing assistance receivers;
- the correct functioning of an assisted approach mode function of each of the aircraft's two multimode landing assistance receivers;
- the correct functioning of each of the aircraft's two multimode landing assistance receivers;
- the correct functioning of each of the aircraft's three inertial reference systems, integrating aerodynamic data;
- the correct functioning of an attitude and direction indicator of the aircraft;
- the integrity and precision of a position value of the aircraft;
- the uncertainty regarding this position value of the aircraft;
- the consistency between a position of the aircraft, calculated by a flight management computer of the aircraft, and a position of the aircraft received from a satellite positioning system;
- the precision of an altitude value of the aircraft; and possibly
- the correct functioning of an automatic pilot of the aircraft.

Furthermore, advantageously, in step b) a first approach category is determined when the following conditions are verified simultaneously:
- two flight management computers of the aircraft are functioning correctly;

satellite positioning functions of two multimode landing assistance receivers of the aircraft are functioning correctly;

at least two inertial reference systems of the aircraft, integrating aerodynamic data, are functioning correctly;

at least one assisted approach mode function of a multimode landing assistance receiver of the aircraft is functioning correctly;

an altitude value of the aircraft has a precision that is greater than a predetermined value;

the integrity and precision of a position value of the aircraft are achieved; and a position of the aircraft, calculated by a flight management computer of the aircraft, and a position of the aircraft, received from a satellite positioning system, are consistent.

Furthermore, advantageously, in step b) a second approach category is determined when the following conditions are verified simultaneously:

at least one flight management computer of the aircraft is functioning correctly;

at least one inertial reference system of the aircraft, integrating aerodynamic data, is functioning correctly;

at least one assisted approach mode function of a multimode landing assistance receiver of the aircraft is functioning correctly; and a position value of the aircraft exhibits low uncertainty.

Furthermore, advantageously, in step b) a third approach category is determined when the following conditions are verified simultaneously:

at least one flight management computer of the aircraft is functioning correctly;

at least one inertial reference system of the aircraft, integrating aerodynamic data, is functioning correctly;

at least one assisted approach mode function of a multimode landing assistance receiver of the aircraft is functioning correctly; and a position value of the aircraft exhibits high uncertainty.

Furthermore, advantageously, in step b) a fourth approach category is determined when at least one of the following conditions A, B, C and D is verified:

A/ two flight management computers of the aircraft are not functioning correctly;

B/ two multimode landing assistance receivers of the aircraft are not functioning correctly;

C/ three inertial reference systems of the aircraft, integrating aerodynamic data, are not functioning correctly;

D/ assisted approach mode functions of two multimode landing assistance receivers of the aircraft are not functioning correctly.

The present invention also relates to a device to assist in the piloting of an aircraft in a non-precision approach during a landing phase.

According to the invention, this device is noteworthy in that it comprises:

first means of verifying a plurality of conditions relating to at least the correct functioning of a plurality of equipments of the aircraft, and to the integrity and precision of measurements of particular parameters, information coming from the said equipments and the said measurements being able to be used for the implementation of the said non-precision approach;

second means for selecting, on the basis of the said verified conditions, an appropriate approach category from among a plurality of different approach categories; and display means for presenting, on a display screen of the aircraft, the approach category selected by the said second means.

In a particular embodiment, the said display screen is a primary screen for piloting the aircraft and the said display means present the said approach category in a zone of the said primary piloting screen, which is usually used for the display of an approach category during an instrument approach.

BRIEF DESCRIPTION OF THE DRAWING

The unique FIGURE of the appended drawing will give an understanding of how the invention may be embodied. This FIGURE is the block diagram of a device according to the invention.

DETAILED DESCRIPTION OF THE INVENTION

The device 1 according to the invention is intended to assist the pilot of an aircraft, in particular a civil transport aircraft, during a landing phase of the aircraft in the case of a non-precision approach.

According to the invention, the said device 1 which is installed in the aircraft (not shown) comprises:

a set 2 of information sources 3A, 3B, . . . , 3N comprising, in particular, various equipments (computers, measuring instruments, etc.) of the aircraft as described below;

means 4 which are connected by a link 5 to the set 2 of information sources and which are designed to verify a plurality of conditions relating at least to the correct functioning of a plurality of the said equipments 3A, . . . , 3N of the aircraft, and to the integrity and measurement precision of particular parameters, made by some of these equipments 3A to 3N;

means 6, for example an FG (Flight Guidance) computer, which are connected by a link 7 to the said means 4 and which are designed to select, on the basis of the verifications carried out by the said means 4, an appropriate approach category from among a plurality of different approach categories; and display means 8 which are connected by a link 9 to the means 6 and which are designed to present, on a display screen 10, the approach category selected by the said means 6.

Preferably, the said means 4 and 6 are integrated in a single computing unit 11.

Furthermore, in a particular embodiment, the said display screen 10 is a usual primary piloting screen of the aircraft of the PFD (Primary Flight Display) type and the display means 8 show the said approach category in a zone 12 of the said primary piloting screen 10, which is usually used for the display of an approach category during a normal instrument approach.

This particular embodiment has the advantage of allowing an improvement of the ergonomics for the pilot, since the latter thus has the availability of approach category information in the same location (zone 12) as used during a precision instrument approach.

The present invention applies more particularly to an aircraft which comprises, in particular, the following information sources forming part of the said set 2:

two flight management computers, preferably of the FMS (Flight Management System) type;

two multimode landing assistance receivers, preferably of the MMR (Multi Mode Receiver) type, each of which comprises:

an FLS assisted approach mode function as described below; and a satellite positioning function in association with a system of the GPS (Global Positioning System) type;

three inertial reference systems integrating aerodynamic data, of the ADIRS (Air Data Inertial Reference System) type;

an automatic pilot; and a flight attitude and direction indicator, which is particularly useful when the automatic pilot is not in use, that is to say in manual piloting, and which then displays piloting assistance information on the PFD primary piloting screen.

In a preferred embodiment, the said means 4 verify the following conditions:

C1/ the correct functioning of each of the two FMS flight management computers;

C2/ the correct functioning of the GPS satellite positioning function of each of the two MMR multimode landing assistance receivers;

C3/ the correct functioning of the FLS assisted approach mode function of each of the two MMR multimode landing assistance receivers;

C4/ the correct functioning of each of the said two MMR multimode landing assistance receivers;

C5/ the correct functioning of each of the three ADIRS inertial reference systems integrating aerodynamic data;

C6/ the correct functioning of the flight attitude and direction indicator;

C7/ the integrity and precision of a position value of the aircraft;

C8/ the uncertainty regarding this position value of the aircraft;

C9/ the consistency between the position of the aircraft as calculated by an FMS flight management computer of the aircraft and a position of the aircraft as received from a GPS satellite positioning system;

C10/ the precision of an altitude value of the aircraft; and possibly

C11/ the correct functioning of the automatic pilot.

With regard to condition C7, in a particular embodiment, the FMS flight management computer calculates the position of the aircraft on the basis of values provided by the usual sources (ADIRS, GPS, VOR, DME). Furthermore, it monitors the integrity and precision of this position value. The said FMS flight management computer can calculate the position of the aircraft in different ways corresponding to the different known navigation modes: "IRS/GPS", "IRS/DME/DME", "IRSNOR/DME" and "IRS Only", quoted in order of decreasing precision.

In addition to the calculation of the position value, the FMS computer makes an estimation of the uncertainty regarding this position value. This uncertainty can be low or high (condition C8).

In order to verify the condition C9, the means 4 can comprise a warning computer of the FWC (Flight Warning Computer) type, which calculates the difference between the two positions, compares that difference with a predetermined value and deduces from this that the two positions are consistent only when the said difference is less than the said predetermined value.

Furthermore, regarding the condition C10:

in a first variant, the difference between the altitude values provided by the usual two sub-computers FMS1 and FMS2 of the FMS computer is calculated; and in a second variant, the difference between the altitude values provided, on the one hand, by the FMS computer (FMS1 or FMS2 or both of them) and, on the other hand, by an equipment (GPS, ADIRS, radio-altimeter) which is independent of the FMS computer, is calculated.

In both of the preceding cases, this difference is compared with a predetermined value, and it is deduced that the altitude value is precise only when this difference is less than the said predetermined value.

In the context of the present invention, an approach category is synthetic information allowing the pilot to appreciate the integrity, precision and availability of information and measurements which are provided to him by the on-board equipments during the landing. Each approach category defines the approach mode or modes that are possible from among the different assisted approach modes, as described below, during a non-precision landing.

Consequently, the degree of confidence that the pilot can have in the information provided to him varies according to the effective approach category, determined by means of the invention. From an operational point of view, for the approach categories relating to a reduced availability, precision or integrity, the pilot must overcome the lack of availability, precision or integrity by supplementary data verification actions.

Thus, depending on the approach category that is presented to him (according to the present invention) on the display screen 10, the pilot chooses, for the landing, between:

one of a plurality of possible assisted approach modes (able to be used by an FLS assisted approach mode function) for which:

a virtual approach path is determined, in particular with the help of information contained in a database (not shown) installed in the aircraft;

the lateral and vertical deviations of the position of the aircraft with respect to this virtual approach path is calculated; and these deviations are presented to the pilot.

The aircraft is then piloted in such a way as to cancel these deviations; and a selected approach mode, for which the pilot enters descent instructions (slope, heading, etc.) into an automatic pilot which carries out the piloting of the aircraft.

In a preferred embodiment, the means 6 determine a first approach category called "F-APP", when the following conditions are verified simultaneously:

both of the FMS flight management computers are functioning correctly;

the GPS satellite positioning functions of the two MMR multimode landing assistance receivers are functioning correctly;

at least two ADIRS inertial reference systems, integrating aerodynamic data, are functioning correctly;

at least the FLS assisted approach mode function of an MMR multimode landing assistance receiver is functioning correctly;

the altitude value of the aircraft has a precision which is greater than a predetermined value;

the integrity and precision of a position value of the aircraft are achieved; and a position of the aircraft, calculated by an FMS flight management computer of the aircraft, and a position of the aircraft received by a GPS satellite positioning system are consistent.

When this first category "F-APP" is shown on the display screen 10, the pilot can choose any one of the various possible assisted approach modes.

Furthermore, the means 6 determine a second approach category called "F-APP+RAW" when the following conditions are verified simultaneously:
- at least one FMS flight management computer is functioning correctly;
- at least one ADIRS inertial reference system integrating aerodynamic data is functioning correctly;
- at least the FLS assisted approach mode function of an MMR multimode landing assistance receiver is functioning correctly; and
- a position value of the aircraft has low uncertainty.

When the "F-APP+RAW" category is shown in the display screen 10, the pilot can also choose any one of the various assisted approach modes but he must verify the consistency between, on the one hand, information provided by the various systems of the aircraft and, on the other hand, navigation data such as, for example, positions of ground markers, route points, etc. These items of navigation data are sometimes called "RAW data" and are shown in a normal "ND" (Navigation Display) type screen.

Furthermore, the means 6 determine a third approach category called "RAW ONLY", when the following conditions are verified simultaneously:
- at least one FMS flight management computer of the aircraft is functioning correctly;
- at least one ADIRS inertial reference system integrating aerodynamic data is functioning correctly;
- at least the FLS assisted approach mode function of an MMR multimode landing assistance receiver is functioning correctly; and
- a position value of the aircraft has high uncertainty.

When the "RAW ONLY" category is displayed, the pilot must preferably not use the lateral and vertical deviation information with respect to a virtual approach path, displayed in the piloting position, because a loss of precision appears in the position value. In this case, he must preferably use the said navigation data ("RAW data"). Consequently, he should not choose the assisted approach modes, which make use of the said previously mentioned deviations resulting from an FLS assisted approach mode function and he should therefore choose only the said selected approach mode. If he nevertheless chooses to use an assisted approach mode, he must then check the validity of the information used for guiding the aircraft.

Furthermore, the said means 6 can also determine a fourth approach category, when at least one of the following conditions A, B, C and D is verified:
A/ the two FMS flight management computers of the aircraft are not functioning correctly;
B/ the two MMR multimode landing assistance receivers of the aircraft are not functioning correctly;
C/ the three ADIRS inertial reference systems of the aircraft, integrating aerodynamic data, are not functioning correctly;
D/ the FLS assisted approach mode functions of the two MMR multimode landing assistance receivers of the aircraft are not functioning correctly.

With this fourth approach category, only a selected approach mode may be used.

The device 1 according to the present invention therefore makes it possible to reduce the workload of the pilot by presenting him, in a synthetic manner, with information (selected approach category) allowing him to choose immediately the approach mode that he will use and the way of implementing it.

In a particular embodiment, when the aircraft is in the first "F-APP" category, it retrogresses, according to the invention:

into the second category "F-APP-+RAW", when one of the following conditions is verified:
- an FMS flight management computer is not functioning correctly;
- the satellite positioning function of an MMR multimode landing assistance receiver is not functioning correctly;
- the position value of the aircraft has an integrity and/or precision error and, simultaneously, the position value of the aircraft has low uncertainty;
- the altitude value is not precise;
- the two aforesaid positions (FMS, GPS) are not consistent; and into the third "RAW ONLY" category, when the position value of the aircraft has an integrity and/or precision error and, simultaneously, this position value of the aircraft has a high uncertainty.

Furthermore, when the aircraft is in the second "F-APP+RAW" category, it retrogresses into the third "RAW ONLY" category when the uncertainty regarding the position of the aircraft becomes high.

The invention claimed is:

1. A method to assist the piloting of an aircraft in a non-precision approach during a landing phase, wherein a series of successive steps is carried out automatically, the series of steps comprising:
a) verifying, according to respective standards of operation, conditions relating to the correct functioning of a plurality of equipment of the aircraft and to the integrity and precision of measurements of parameters used for implementing the non-precision approach, based on information coming from the plurality of equipment;
b) selecting, on the basis of the verified conditions, one of a plurality of different non-precision approach categories; and
c) presenting the selected approach category on a display screen, wherein:
each non-precision approach category defines the approach mode or modes that are possible from among a plurality of approach modes including a plurality of assisted approach modes and a selected approach mode,
in step b) a first approach category is selected when the following conditions are verified simultaneously in step a):
two flight management computers of the aircraft are functioning correctly;
satellite positioning functions of two multimode landing assistance receivers of the aircraft are functioning correctly;
at least two inertial reference systems of the aircraft, integrating aerodynamic data, are functioning correctly;
at least one assisted approach mode function of at least one of the multimode landing assistance receivers is functioning correctly;
an altitude value of the aircraft has a precision that is greater than a predetermined value;
the integrity and precision of a position value of the aircraft are achieved; and
a position of the aircraft, calculated by at least one of the flight management computers, and a position of the aircraft, received from a satellite positioning system, are consistent, and
if the selected approach category is the first approach category, a pilot may choose any one of the various possible assisted approach modes as the approach mode for landing the aircraft.

2. The method of claim 1, wherein the conditions verified in step a) include:
- verifying the correct functioning of an assisted approach mode function of each of the two multimode landing assistance receivers;
- verifying the correct functioning of each of three inertial reference systems, which integrate aerodynamic data;
- verifying the correct functioning of an attitude and direction indicator of the aircraft; or
- verifying the uncertainty of the position value of the aircraft.

3. The method of claim 1, wherein step a) further comprises verifying, according to a standard of operation, the correct functioning of an automatic pilot of the aircraft.

4. The method of claim 1, wherein the method is performed by a device of the aircraft.

* * * * *